G. M. LAUB.
PROCESS OF MANUFACTURING MEANS FOR SIMULTANEOUSLY PRINTING, PERFORATING, AND CUTTING.
APPLICATION FILED NOV. 15, 1911.

1,056,805.

Patented Mar. 25, 1913.

3 SHEETS—SHEET 1.

WITNESSES
F. J. Hartman
J. Stuart Freeman

INVENTOR
George M. Laub.
BY
ATTORNEY

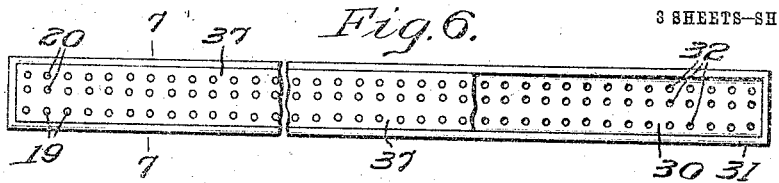
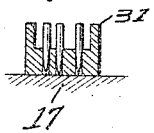 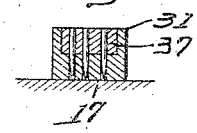
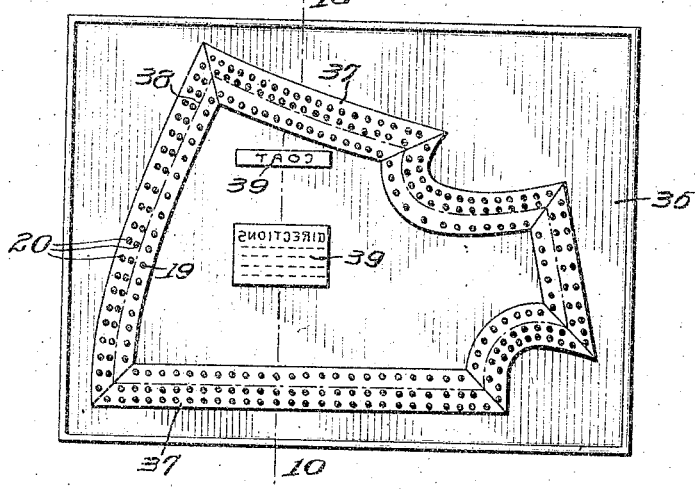
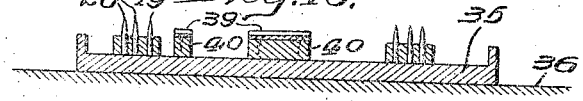

G. M. LAUB.
PROCESS OF MANUFACTURING MEANS FOR SIMULTANEOUSLY PRINTING, PERFORATING, AND CUTTING.
APPLICATION FILED NOV. 15, 1911.
1,056,805.
Patented Mar. 25, 1913.
3 SHEETS—SHEET 3.
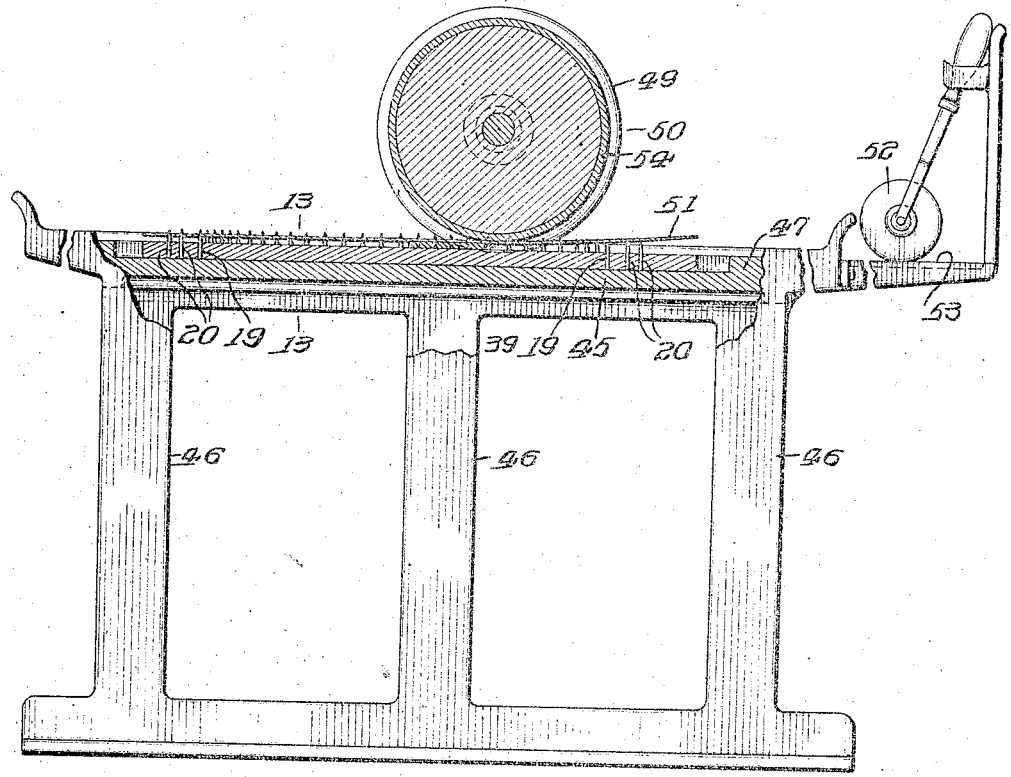
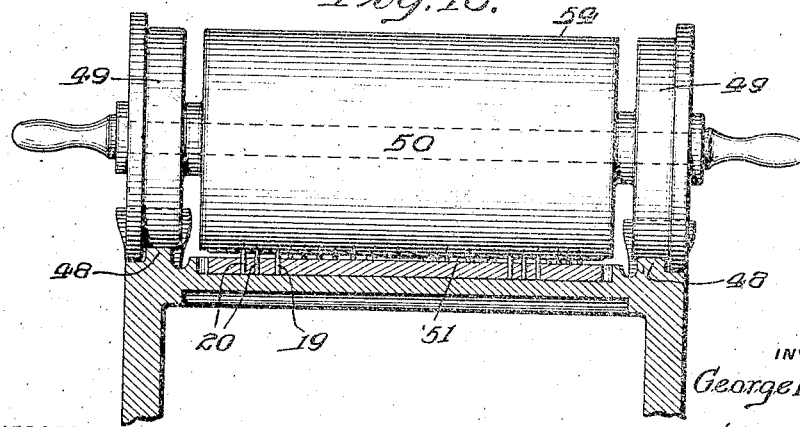
INVENTOR
George M Laub.
WITNESSES
ATTORNEY

UNITED STATES PATENT OFFICE.

GEORGE M. LAUB, OF NEWARK, NEW JERSEY, ASSIGNOR TO MODEL PATTERN COMPANY, A CORPORATION OF NEW YORK.

PROCESS OF MANUFACTURING MEANS FOR SIMULTANEOUSLY PRINTING, PERFORATING, AND CUTTING.

1,056,805.   Specification of Letters Patent.   Patented Mar. 25, 1913.

Application filed November 15, 1911. Serial No. 660,336.

*To all whom it may concern:*

Be it known that I, GEORGE M. LAUB, a citizen of the United States, and a resident of the city of Newark, county of Essex, and State of New Jersey, have invented certain new and useful Improvements in the Process of Manufacturing Means for Simultaneously Printing, Perforating, and Cutting, of which the following is a full, clear, and complete disclosure.

The object of the invention is to provide an improved process for manufacturing the combined printing, perforating and cutting means herein described.

With these and other objects in view, such as are brought out in the following specification and appended claims, the invention in its preferred form is shown in the accompanying drawings, in which—

Figure 1:
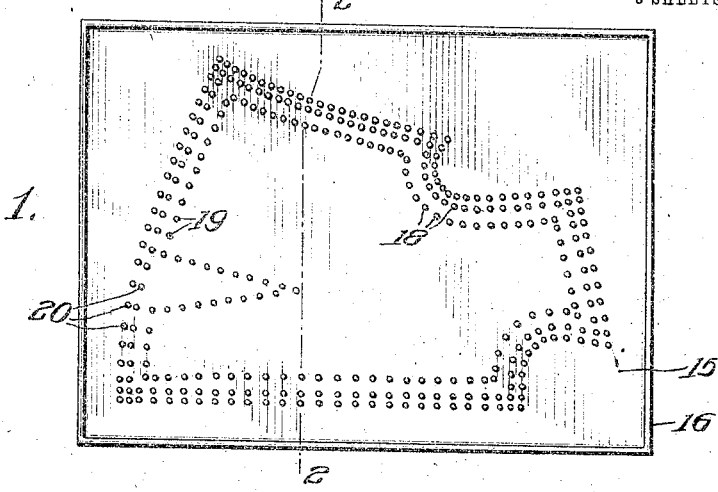
Figure 2:
Figure 3:
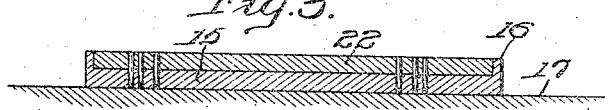
Figure 4:
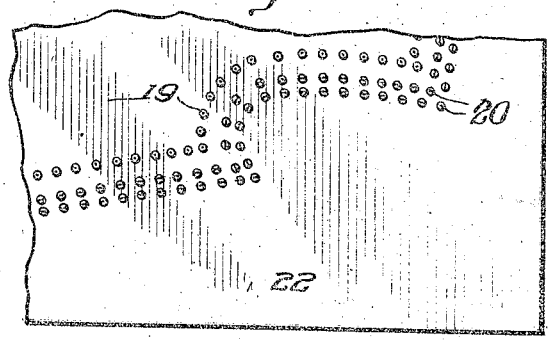
Figure 5:
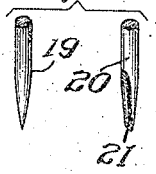

Figure 1 is a plan view of a perforated holder or pattern mold with the perforating and cutting pins stuck into the apertures therein; Fig. 2 is a section on the line 2—2 of Fig. 1; Fig. 3 is a section similar to Fig. 2 but showing the backing material for and surrounding the pins; Fig. 4 is an enlarged fragmentary section of a sheet of the backing material removed from the mold and containing the perforating and cutting pins; Fig. 5 is a perspective view showing two forms of pins; Fig. 6 is a plan view of the holder or mold for forming strips of backing material and mutilating means, and partly filled therewith; Fig. 7 is a section on the line 7—7 of Fig. 6; Fig. 8 is a section similar to Fig. 7 but showing the backing material within the mold; Fig. 9 is a plan view of a holder or mold showing strips of backing material and mutilating means carried thereby bent to form a pattern, there being also shown cuts or electrotypes for printing a sheet of material simultaneously with the mutilation thereof by the pins; Fig. 10 is a section on the line 10—10 of Fig. 9; Fig. 11 is a section similar to Fig. 10, showing backing material uniting the respective strips and blocks of the same material respectively holding the pins and cuts shown in Fig. 10; Fig. 12 is a side elevation partly in section showing a common form of proof press, which is intended to represent any suitable mechanism for mutilating sheets of material by printing, perforating and cutting in the improved process; and Fig. 13 is a vertical section on the line 13—13 of Fig. 12.

Referring to the drawings, the preferred form of the invention comprises a holder or mold 15 which is flat and preferably provided with peripheral, upwardly projecting flanges 16, and when in use is placed upon any suitable smooth flat support 17, such as marble, solid or sheet metal, wood, or the like. As shown in Fig. 1, the mold is provided with parallel rows of axially parallel openings 18, generally extending through the mold in a vertical direction, but when desired it is possible to have the openings comprise recesses of equal depth. These rows of openings, furthermore, may be either equally or unequally spaced and arranged to form any arbitrary design, such as letters, figures, etc., they being shown in the present case of the latter form for a purpose hereinafter described.

Inserted into each of the recesses 18, with the points downward and resting upon the supporting surface 17, are steel pins 19 and 20, for perforating and cutting respectively, the pins being substantially twice as long as the depth of the recesses 18, and protruding above the surface of the mold to a height equal to that of the flanges 16. The pins 19 are usually inserted in the holes along the innermost line of the design, while the pins 20 are inserted in a like manner in the remaining line or lines and with their sharpened edges in alinement, it being understood that the perforations made by the former, when the process is used in the manufacture of dress patterns, designate the line that the stitches of thread are to take, while the latter form a broken cut line along which the pattern is torn to provide for a desired width of seam. After placing the holder or mold upon its support and filling the openings therein with the respective forms of pins as shown in Fig. 2, there is poured into the mold a composition of tar and other ingredients, or in fact any suitable compound, which upon cooling hardens and firmly grips the butt end of each pin, whereupon said material is removed from the mold with the pins embedded in it, leaving the recesses in the mold body simultaneously therewith. The material with the pins embedded therein is thus formed primarily in a substantially flat block, which may then, without alteration, be placed upon the bed of such a press as is shown in Figs. 12 and 13 of the drawings. However, carrying out the common and well known method of applying printing and perforating forms to rollers, this primarily flat block may be heated and then curved by any suitable method, such as, for instance, in a stereotype form, after which it may be readily placed upon the cylindrical surface of the roller 50 in the press shown in the above mentioned figures. This last described form, which may be given to the block of material, while not generically new, in view of the common stereotype practice, is mentioned in view of the fact that the block formed by this process may be operated either upon the surface of a roller, or upon a printing press bed with equal efficiency, said last-mentioned or flat form alone having been illustrated in the accompanying drawings, simply for the purpose of showing one of the two operative methods, in which it might be adapted to any ordinary type of cylinder press, and as all that is necessary.

In the modified form of the invention, as shown in Figs. 6 to 11 inclusive, there is employed an elongated holder or mold 30 having upwardly extending peripheral flanges 31, substantially equal in height above said mold to the thickness of the mold, and having at spaced intervals throughout its surface vertical axially parallel recesses 32, preferably extending through to the bottom of the mold. The apertures 32 lie in parallel lines, said lines generally being arranged with unequal intervening spaces for the same purpose as that described in the preferred form, while in the recesses are inserted pins also similar to those used in the preferred form, and having their butt ends projecting above the surface of the mold and terminating in a plane with the upper edges of the surrounding flanges. As in the preferred form, there is also poured into the mold 30 melted backing material which, surrounding the butt ends of the pins, cools, and on being removed, also removes the pins from their corresponding recesses and forms a strip of hard material, firmly carrying in unitary relation therewith the respective pointed and edged pins, the latter being arranged with their edges in alinement.

In this form there is also provided a second receptacle or mold 35 similar to that shown in Fig. 1, but having an imperforate inner surface. This mold is laid upon a flat support 36, and within it is arranged a plurality of strips 37 of the material previously formed in the mold 30 by the method described in the preceding paragraph but bent when necessary by the application of heat thereto, to conform to the outline 38 of a predetermined configuration, such for instance as a dress pattern. But it is not to be understood that this can be used only for dress pattern making, for it is applicable to any purpose requiring a similar treatment of sheet material such as the mutilation of checks, drafts and other legal papers.

As shown in Fig. 9, there is first drawn upon the inner flat surface of the mold 35 the outline 38 of any desired pattern, and the various strips 37 are bent and mitered form a continuous line of said material centered directly above the line 38 of the desired pattern, and carrying the pins 19 and 20 in such relation that when a sheet of paper or other suitable material is pressed thereover, respectively pointed and elongated perforations will be made in said sheet, the former designating the lines upon which the stitches are to be taken, while the latter causing long or short cuts, near together or farther apart, as may be desired, determine the optional width of the seam and along which the pattern outline may be drawn, or the sheet of material torn.

For printing upon the pattern sheet, the name of the pattern, directions, etc., there are provided various slugs, cuts or electrotypes 39, preferably backed up with blocks 40 of material similar to that comprising the strips 37. These cuts are arranged in any desired manner upon the surface of the mold 35, and about the whole design is poured backing material 41, in a liquid state of the same nature as that used in the strips 37, and blocks 40. In pouring the material 41 into the mold, it is essential that it shall be of such temperature that it will flow comparatively freely, soften and unify itself with the respective strips and blocks form one piece, but at the same time not soften the strips and blocks to such an extent, that the respective pins and cuts will be displaced from their desired positions. When the material has solidified it is removed as one piece from the mold and placed flatly in any suitable form or press, preferably one having a horizontal bed, and for convenience, the simplest form of copy press is illustrated in Figs. 12 and 13. In the copy press the bed 45 is supported by suitable legs or standards 46, and is surrounded by an upwardly projecting portion 47, and on opposite sides thereof by a pair of rails 48, upon which the flanged wheels 49, secured on a common shaft with an impression roller 50, travel. This, as stated, is but a simple device for completing the process of mutilating a sheet of material simultaneously in the three ways of printing, perforating and cutting, but it is to be understood that any mechanically inked, fed and operated press can be used, and particularly one in which either the platen or the design moves horizontally.

Preparatory to the act of reproducing the desired design upon the paper or other material, in operating the device for completing the process, the cuts 39 and pins 19 and 20 are inked in any convenient manner, as for instance by the use of the inking roller 52, arranged to receive its ink from a table 53. Then a sheet of material 51, of any desired thickness, composition, shape or size, such as paper, fiber, cloth, metal, etc., is placed in a position to rest lightly upon the upwardly projecting points of the needles 19 and 20, whereupon the roller 50 is run over the surface thereof, causing by its weight the needles to respectively perforate and cut the sheet, and the points thereof to enter the blanket 54 of the roller, and the sheet to come into contact with the surface of the cuts. After the roller has completed its course along the rails of the press, the sheet is removed from the form having been perforated, cut and printed at one and the same time. Then, to transfer the perforated and cut pattern to a piece of material, a cloth or brush, carrying powder of a contrasting color, is rubbed over the surface of the pattern, leaving an outline on the material therebeneath, corresponding to the rows of perforations.

In the application of this device to the cancelation or other marking of legal documents, it is obvious that an improvement is presented over all forms of canceling devices which simply perforate or print, or both, for, from the fact that the pins themselves are inked, the ink thereon is carried through the paper, some of it being deposited on the raw edges of the material surrounding the individual perforations, while some of its remains on each of the front and rear surfaces, making it quite impossible to alter any marking brought about in this way, for, while simple perforations have been refilled, it is impossible to remove the ink marks adjacent to and in the fiber of the material directly surrounding the holes.

Thus it can be understood from the foregoing that the present invention, while presenting a device employing materials which are inexpensive and capable of unlimited reuse, is not confined to the exact design and operation illustrated and described, but any modifications may be made therein which do not depart from the spirit of the invention or are beyond the scope of the appended claims.

Having thus described my invention, what I claim and desire to protect by Letters Patent of the United States is:

1. The process of forming a die, which consists in arranging spaced mutilating means in parallel series of openings in a relatively narrow, elongated holder, then uniting said means to form a strip, then heating and bending said strip in its plane to form any desired configuration.

2. The process of forming a die, which consists in arranging spaced mutilating means in parallel series of openings in a narrow, elongated holder, then uniting said means to form a strip, then heating and bending said strip to form any desired configuration.

3. The process of forming a die for simultaneous printing, perforating and cutting, which consists in arranging spaced mutilating means in parallel series of openings in a relatively narrow, elongated holder, then uniting said means to form a strip, then heating and bending said strip in its plane to form any desired configuration, forming a printing means and backing the same, and then uniting said mutilating and printing means.

4. The process of forming a die for simultaneous printing, perforating and cutting, which consists in arranging spaced mutilating means in parallel series of openings in a relatively narrow, elongated holder, then uniting the butt ends of said means by a permanent backing to form a strip, then heating and bending said strip in its plane to form any desired configuration, forming a cut and backing the same, placing said cut in a plane slightly lower than that of the extremities of said means, and uniting said strip and the backing of said cut to form a unitary structure.

5. The process for forming a die for simultaneous printing, perforating and cutting, which consists in arranging spaced mutilating means in parallel series of openings in a relatively narrow, elongated holder, then uniting the butt ends of said means by a permanent backing to form a strip, then heating and bending said strip in its plane to form any desired configuration, forming a cut and backing the same, and uniting said strip and the backing of said cut to form a unitary structure.

6. The process of forming a die for simultaneous printing, perforating and cutting, which consists in arranging spaced mutilating means in openings provided therefor in a holder, then uniting the butt ends of said means by a permanent backing to form a block, then heating and bending said block to form any desired configuration.

In witness whereof I have hereunto set my hand this 3rd day of November, A. D., 1911.

GEORGE M. LAUB.

Witnesses:
    EDWARD N. KINGSTON,
    JAMES M. WOOLWORTH.